Figure 1:
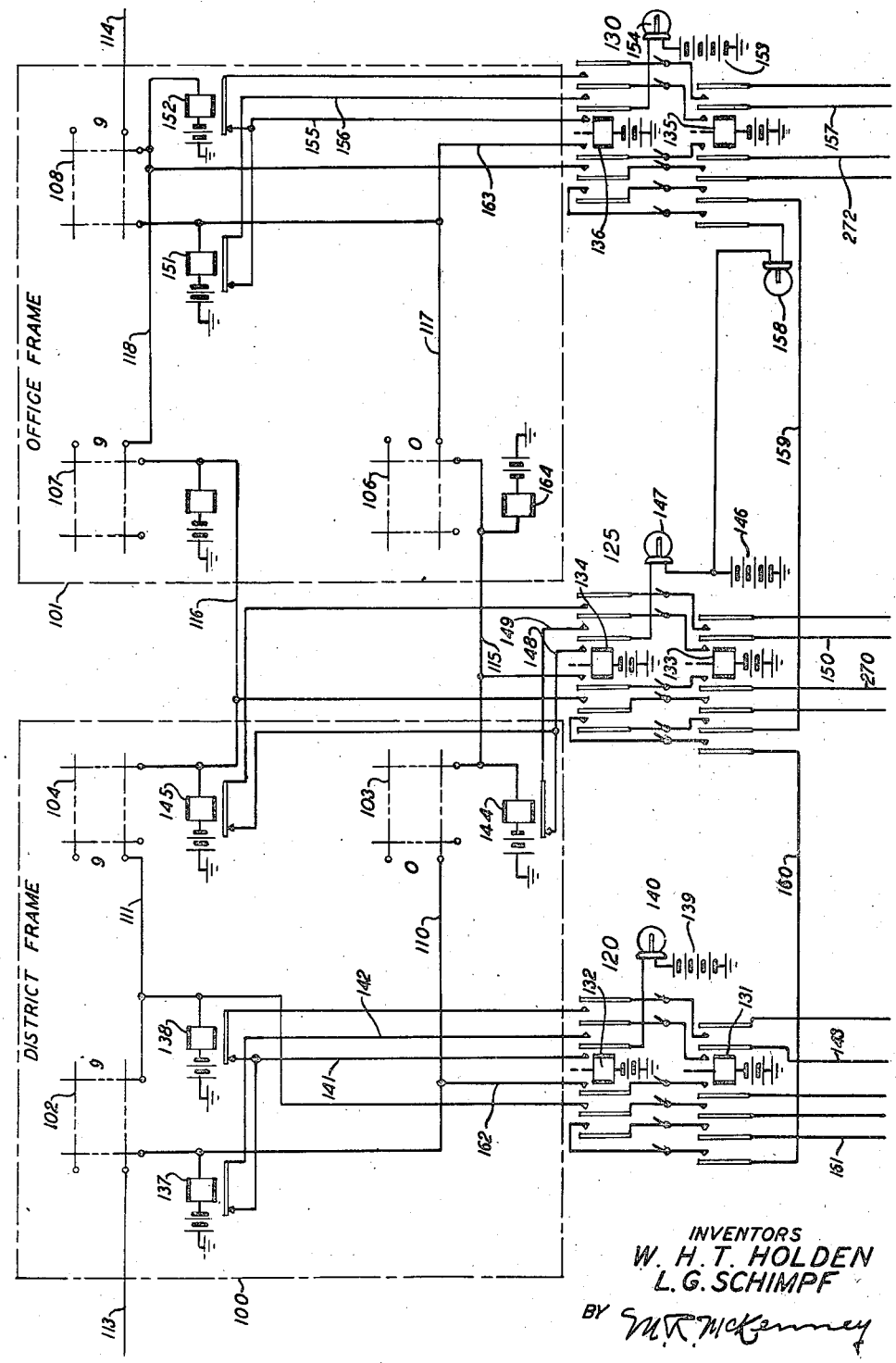

INVENTORS
W. H. T. HOLDEN
L. G. SCHIMPF
BY
ATTORNEY

April 6, 1943.  W. H. T. HOLDEN ET AL  2,315,705
TESTING AND SELECTING SYSTEM
Filed July 31, 1941  2 Sheets-Sheet 2
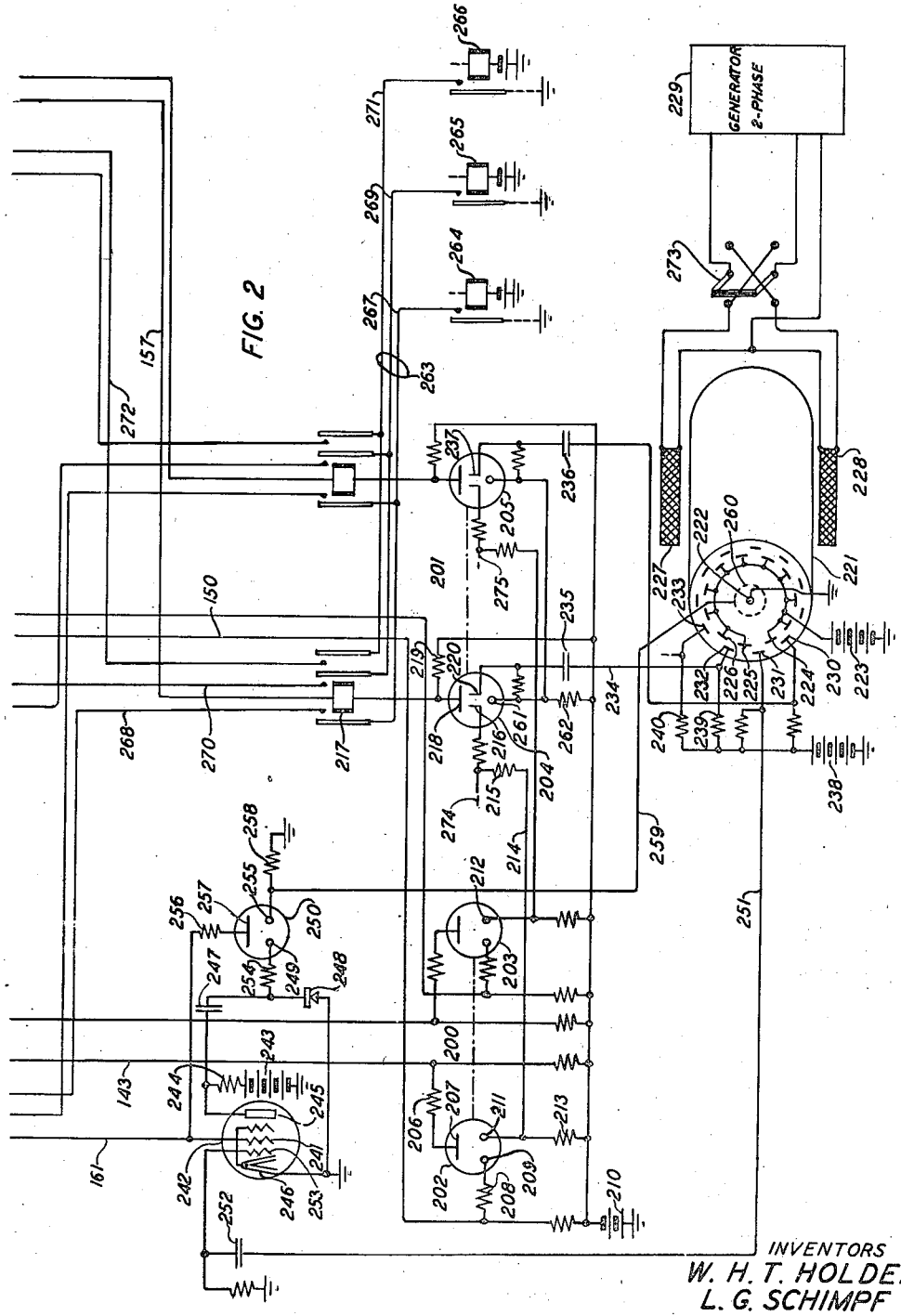
INVENTORS
W. H. T. HOLDEN
L. G. SCHIMPF
BY
ATTORNEY Patented Apr. 6, 1943

2,315,705

UNITED STATES PATENT OFFICE 2,315,705

TESTING AND SELECTING SYSTEM

William H. T. Holden, Woodside, and Luther G. Schimpf, St. George, N. Y., assignors to Bell Telephone Laboratories, Incorporated, New York, N. Y., a corporation of New York Application July 31, 1941, Serial No. 404,804

7 Claims. (Cl. 179—18)

This invention relates to testing and selecting systems and particularly to those employed in the establishment of telephone or other communication connections.

The objects of the invention are to simplify the operations involved in the testing of links, trunks or other circuits used in communication systems; to enable the performance of these tests with greater speed and accuracy; to provide for testing the links or other circuits sequentially in order that double connections may be avoided and in order that the most efficient use of these circuits may be realized; and to obtain other improvements and advantages in systems of this character.

In systems of the well-known crossbar type where connections between incoming and outgoing circuits are performed at switching stages comprising a plurality of interconnecting channels, each of which includes a number of serially related links, it has been the common practice to test the several channels provided for interconnecting any incoming trunk to any outgoing trunk by means of testing relays. These relays are usually common to the switching stages and serve to determine the busy or idle condition of each of the individual links involved in each of the interconnecting channels.

In accordance with a feature of the present invention the testing relays of these prior systems are replaced by discharge tubes having electrodes to which potentials are applied in accordance with the idle condition of the links comprising the several connecting channels, together with means for producing a multiplicity of impulses of different phases and for applying these impulses to the testing tubes cyclically to cause the operation of the first tube in order which corresponds to a channel having all of its component links idle. As soon as one of the tubes has been operated to select the corresponding idle channel, all other tubes are rendered ineffective to prevent the false operation thereof and the selection of a second channel to serve the same connection.

Another feature of the invention is a system in which a radial beam discharge tube is provided for producing the impulses of different phases and for applying them to the electrodes of the channel test tubes.

A further feature of the invention is a testing arrangement in which the direction of rotation of the beam may be reversed in order to reverse the order in which the test is made of the several connecting channels.

These and other features of the invention will be discussed more fully in the following detailed specification.

In the drawings accompanying the specification:

Fig. 1 illustrates two frames of automatic switches through which connections are established. This figure also shows the frame connectors which serve to connect to these frames one of a number of common switch controlling markers; and Fig. 2 illustrates portions of one of these switch-controlling markers.

Although the invention is applicable to testing arrangements for testing links, trunks or other circuits in various types of communication systems, it has been disclosed herein for the purpose of illustration in a telephone system of the crossbar type. In such a system connections are established through successive frames of crossbar switches, such as the district frame and the office frame by way of connecting channels, each of which comprises as many as three separate link circuits arranged in serial relation. Since these links are capable of being used in a plurality of different channels, it is necessary to test the component links of each channel capable of serving the particular call to determine which channels are idle, in other words, to determine which channels have all of their component links in an idle condition.

In the system illustrated herein these matching tests are performed by space discharge tubes in the common marker, these tubes being associated respectively through the frame connectors with the connecting channels over which the call may be extended. The condition of the component links of each channel determines the potentials to be applied to the electrodes of the associated tube. If this preliminary test determines that several equivalent channels are idle at the time, it is desirable to choose only one of these and to prevent the accidental selection of a second one. It is further desired on the first attempt to select the lowest numbered idle channel in the group of channels sequentially tested. This is accomplished by means of a multiplex impulse generating tube which delivers impulses of successive phases to the test tubes. The first tube, representing an idle channel, to receive one of these phase impulses operates and causes the selection of the associated channel and brings about the exclusion of the remaining idle channels.

Referring particularly to the drawings, two frames of crossbar switches are illustrated, a district frame 100 and an office frame 101. It will be assumed that each of these frames comprises ten primary and ten secondary crossbar switches. One district primary switch, the No. 9 switch 102, and two distinct secondary switches, the No. 0 switch 103 and the No. 9 switch 104, are shown. The incoming trunks, such as trunk 113, appear in the horizontal rows of contacts of the primary switches, and the primary switches have access to the secondary switches by way of district links 110, 111. There are ten links appearing in the ten vertical rows of contacts of each primary switch, and these ten links are distributed to the ten secondary switches, appearing in the horizontal rows of contacts of said secondary switches.

Two of the ten primary office switches, the No. 0 switch 106 and the No. 9 switch 107, and one secondary office switch, the No. 9 switch 108, are illustrated.

The one hundred office junctors appearing in the vertical contacts of the ten secondary district switches are divided into ten groups, each group leading to one of ten office frames. Only one of these office frames 101 is shown in the drawings, and the ten office junctors 115, 116 extends from the district frame 100 appearing in the vertical rows of contacts of the ten primary office switches 106, 107. Similar junctor groups from other district frames also appear in these primary office switches. The one hundred office links which appear in the horizontal rows of contacts of the ten primary office switches 106, 107 are divided into ten equal groups, and each group is distributed to the ten secondary office switches. For example, the office link 117 outgoing from the primary switch 106 and the office link 118 outgoing from the primary switch 107 appear in the secondary switch 108. The ten secondary office switches have access to outgoing trunks, one of which, trunk 114, is illustrated.

From the foregoing description it will be seen that there are ten possible channels between any trunk incoming to a district primary switch and any trunk outgoing from an office secondary switch. Each one of these channels comprises a district link, an office junctor and an office link in serial relation. For example, one channel extending from the district primary switch 102 to the secondary office switch 108 comprises the district link 111, office junctor 116 and the office link 118. Another channel between these switches comprises the district link 110, office junctor 115 and the office link 117.

The common marker disclosed in Fig. 2 includes the testing mechanism whereby the component links of the several channels are tested simultaneously to determine which channels are available for use. This testing mechanism includes, among other elements, two series or groups of space discharge tubes 200 and 201, there being ten tubes in each of these series. The ten tubes 202, 203 of the group 200 serve to test the ten district links appearing in any district primary switch and also to test the group of ten office junctors leading to the desired office frame and accessible respectively to the ten district links. The ten tubes 204, 205 of the group 201 serve to test the ten office links which match with the ten office junctors being tested and which have access through a secondary office switch to the selected outgoing trunk.

In order that these tests may be performed the marker is connected at the appropriate time to the district and office frames and to the particular switch on these frames in which the desired trunks appear. These connections are made by the frame connectors 120, 125 and 130. The connector 120 comprises a multicontact relay 131 for the marker illustrated, a similar relay for each other marker having access to the frame, a relay 132 for the primary switch 102, and nine other similar relays for the nine remaining primary switches on the district frame. The connector 125 comprises a multicontact relay 133 for the marker, corresponding relays for other markers, and ten relays, including the relay 134, one for each of the ten groups of office junctors. The connector 130 includes the marker relay 135, corresponding relays for other markers, and ten relays, including relay 136, one for each of the office secondary switches.

The test of the district links is made by connecting battery potential to the normal contacts of all ten of the hold magnets 137, 138 of the appropriate primary switch 102 and by extending circuits from the individual armatures of these magnets to the anodes of the respective tubes of the group 200. For example, the circuit over which the district link 110 is tested may be traced from the positive pole of battery 139, resistance lamp 140, contacts of relay 132, conductor 141, normal contacts of magnet 137 individual to the link 110, conductor 142, contacts of relays 132 and 131, conductor 143, resistor 206 to the anode 207 of tube 202. In a similar manner the test circuits for the remaining nine district links appearing in the switch 102 may be traced to the anodes of the nine other tubes of the group 200.

At the same time the ten office junctors 115 and 116 are tested over circuits extending through the normal contacts of the corresponding secondary switch hold magnets 144, 145 to the starting anodes of the respective tubes of the group 200. For instance, the test circuit for the office junctor 115 may be traced from the positive pole of battery 146, resistance lamp 147, contacts of relay 134, conductor 148, normal contacts of hold magnet 144, conductor 149, contacts of relays 134 and 133, conductor 150, resistor 208, to the starting anode 209 of tube 202. In a similar manner the test circuits for the nine other office junctors may be traced through the contacts of the associated hold magnets on the secondary switches 103, 104 to the starting anodes of the respective tubes of the group 200.

Since the negative pole of battery 210 is connected to the cathodes 211, 212 of the tubes 200, the starting gaps of all tubes corresponding to idle office junctors are ionized. In other words, each office junctor 115, 116 that is idle has its hold magnet 144, 145 in a deenergized condition, and positive potential is applied to the starting anode of the corresponding tube, and the voltage drop across the control gap resulting from this potential and the potential of the battery 210 is sufficient to ionize the control gap. Furthermore, each tube 200 corresponding to an idle district link 110, 111 will discharge its main gap, upon the ionization of its control gap, since positive potential is connected to the anode of the tube over the circuit above traced through the normal contacts of the associated hold magnet of the primary district switch. Thus each combination of an idle district link and an idle office junctor results in the discharge of the corresponding tube 200. For example, if the link 110 and the matching junctor 115 are both idle, the tube 202 operates, and current flows over a circuit from the positive pole of battery 139 thence as previously traced to conductor 143, resistor 206, anode 207, cathode 211, resistor 213 to the negative pole of battery 210. The flow of current through the resistor 213 causes the application of a positive potential by way of conductor 214 and resistor 215 to the starting electrode 216 of the corresponding test tube 204 of the second group 201. In this manner the idle condition of the first two links of the channel through the district and office switches is represented on the corresponding tube 204 by a positive potential on its starting electrode 216.

Concurrently with the foregoing test of the first two links of the several channels, namely, the district link and the office junctor, a test is made of the office links 117, 118 which comprise the third links of the respective channels. The test of the office links is made by applying battery potential through the normal contacts of the associated hold magnets 151, 152 to the main anodes of the respective tubes of the group 201. For example, the test circuit for office link 117 may be traced from the positive pole of battery 153, resistance lamp 154, contacts of relay 136, conductor 155, contacts of hold magnet 151, conductor 156, contacts of relays 136 and 135, conductor 157, winding of relay 217 to the anode 218 of the tube 204. This circuit also extends through resistor 219 to the negative pole of battery 210. The value of resistor 219, however, is too high to permit the operation of relay 217. With positive potential on the starting electrode 216 and positive potential on the main anode 218 the tube 204 is ready to discharge as soon as a negative impulse is applied to the other control electrode 220. Likewise each of the remaining tubes of the group 201 representing a channel in which all of the component links are idle is conditioned for operation by the application of positive potential to the starting electrode and to the main anode.

The negative impulses for operating the control gaps of the tubes 201 are supplied by the rotary beam tube 221. This tube has a central cathode 222 which produces a radial beam in response to the potential applied from the battery 223 to the annular row of screen grids 224, 225, 226, etc. The radial beam is caused to rotate by a magnetic field set up by the windings 227 and 228 when energized in a particular sequence by two-phase current from the source 229. As the beam passes from one screen grid to the next it impinges on the circular row of anodes 230, 231, 232, 233, etc., of which there are ten for the ten respective tubes of the group 201 and an eleventh one for starting purposes. Half of the beam which radiates from the central cathode may be suppressed in any well-known manner to prevent simultaneous impingement on two of the anodes. The first anode 232 is connected by way of conductor 234 through condenser 235 to the starting electrode 220 of the first tube 204. Similarly, the second anode 233 of the radial beam tube is connected to the second one of the test tubes 201, etc., the tenth anode 230 being connected through condenser 236 to the starting electrode 237 of the tenth testing tube 205. The eleventh anode 231 of the radial beam tube is, as above noted, used for starting the testing operation at the proper time. As the beam rotates about tube 221, current flows from the battery 238 through the resistors 239, 240, etc., and impulses of negative polarity are applied to the tubes 201 in succession or in different phases. Normally, however, these impulses are of insufficient voltage to cause the control gaps of the tubes 201 to ionize even though the cooperating electrode is at positive potential. In other words, no one of the tubes 201 will be operated until the rotating beam commences a new cycle following the connection of the marker to the frame and the completion of the tests above described for the various links of the channels. In this way it is possible to commence the selecting operation with the first channel in the group of ten, so that the first idle channel will always be selected to serve the call.

The manner in which the radial beam tube is conditioned at the commencement of a cycle following the testing operation will now be explained. As soon as the connectors 120, 125 and 130 have operated, a circuit is closed from the positive pole of battery 146, resistance lamp 158, contacts of relays 135 and 136, conductor 159, contacts of relays 133 and 134, conductor 160, contacts of relays 131 and 132, conductor 161 to the screen grid 241 of the pentode tube 242. Thereupon the tube conducts and current flows from the positive pole of battery 243, resistor 244, anode 245, cathode 246 to ground. The surge of current through the resistor 244 when the tube discharges lowers the positive potential of the terminal of condenser 247 connected to the anode 245, this condenser having previously been charged through the voltage of battery 243 over a circuit traceable through the rectifier 248 in the high resistance direction. This change in potential on the terminal of condenser 247 causes current to flow from the condenser to the anode 245, cathode 246 through the rectifier 248 in the low resistance direction to the other terminal of condenser 247. Thus no change of potential is produced on the starting anode 249 of the tube 250. As soon thereafter as the beam of the tube 221 reaches the starting anode 231 an impulse of negative polarity is applied over conductor 251 through condenser 252 to the control grid 253. This bias on the control grid arrests the flow of current in the tube 242, and the full voltage of the battery 243 is again applied to the condenser 247. In this case, however, the rectifier 248 impedes the flow of charging current in the condenser 247, resulting in the application of a positive potential through the resistor 254 to the anode 249 of the tube 250. This potential causes a voltage drop across the starting anode 249 and cathode 255, and the control gap ionizes. Thereupon the main gap is discharged, and current flows from battery as previously traced over conductor 161 through the resistor 256, anode 257, cathode 255 to ground through the resistor 258. The flow of current through the resistor 258 causes the application of a positive potential over conductor 259 to the control grid 260 of the radial beam tube 221. The intensity of the beam is thereby increased; consequently the voltage of the negative impulses applied thereafter to the electrodes of the tubes 201 is increased to a value sufficient to cause the ionization of any one of these tubes having a positive potential on its opposite control electrode. For example, if the tube 204 has positive potential on its control electrode 216, indicating that links 110 and 115 are idle, this tube will ionize its control gap 216—220 as soon as the rotating beam impinges on the first anode 232 and applies an impulse of increased negative polarity to the control electrode 220. In like manner as the beam rotates from one position to the next it causes the ionization of the control gaps of all tubes in the group 201 representing matched district links and office junctors that are idle.

Although successive tubes of the group 201 may ionize their control gaps, indicating that two of the links of the corresponding channels are idle, no one of these tubes will discharge its main gap unless the third link of the channel is also idle, which condition is indicated, as above explained, by the presence of positive potential on the main anode of the tube. To illustrate, assume that the first channel, which comprises the links 110, 115 and 117, is idle. In this case positive potential is impressed upon the control electrode 216 and upon the anode 218 of the first tube 204. As soon therefore as a negative impulse of increased potential is applied by the radial beam tube to the control electrode 220 and the control gap ionizes, the main discharge circuit becomes conducting, and current now flows from positive pole of battery 153 thence as previously traced over conductor 157, winding of relay 217, anode 218, cathode 261, resistor 262 to the negative pole of battery 210. The relay 217 operates in this circuit, and the drop across the common resistance 262 raises the potential of the cathodes of the remaining tubes in the group 201 to prevent another one from discharging as the rotating beam continues to apply impulses thereto.

The operation of relay 217 extends the operating conductors 263 through to the hold magnets of the district and office switches in order that these magnets may be operated to complete the connection over the selected idle channel. To this end the relays 264, 265 and 266 are operated at the proper time, and the following circuits are closed for energizing the hold magnets of the switches: ground through the closed contacts of relay 264, conductor 267, contacts of relay 217, conductor 268, contacts of relays 131 and 132, conductor 162 through the winding of hold magnet 137 to battery; ground through the contacts of relay 265, conductor 269, contacts of relay 217, conductor 270, contacts of relays 133 and 134 thence in parallel through the windings of hold magnets 144 and 164 to battery; ground through the contacts of relay 266, conductor 271, contacts of relay 217, conductor 272, contacts of relays 135 and 136, conductor 136 to the winding of hold magnet 151 to battery. The magnets 137, 144, 164 and 151 operate in these circuits and close the contacts of the corresponding switches to establish the desired connection, which may, for example, be a connection incoming over the trunk 113 and outgoing over the trunk 114. In the well-known manner the hold magnets are held in locking circuits which extend through the closed contacts of the switches to controlling relays in the associated circuits.

Thereafter the connectors 120, 125 and 130 are released, all of the operated tubes are extinguished and the other operated elements of the marker are released to restore the marker in order that it may be ready to serve the next call.

If it is desired to start the selecting operation of a group of channels in the reverse direction, this may be accomplished by operating the reversing switch 273 to reverse the rotary movement of the field energized by the windings 227 and 228. Reversing the field causes the beam of the tube 221 to rotate in the opposite direction, and the result is that the selection now gives first preference to the channel represented by the tube 205 instead of the tube 204.

If for any reason it is desired to limit or otherwise control the availability of the links for connections through the frames 100 and 101, this may be accomplished by rendering the links non-selectable in the proper combinations. For example, the marker may be arranged to apply potentials, under the control of pattern relays, to conductors 274, 275, to prevent the selection of any one or more of the channels undergoing test.

For a more complete understanding of the details of the crossbar system and the operation of the switches and markers, reference may be had to the patent to Carpenter, No. 2,235,803 of March 18, 1941. Also reference may be made to the patent to Skellett, No. 2,217,774 of October 15, 1940, for a better understanding of the construction and operation of radial beam tubes of the type suitable for use in this system. This patent also shows how one half of the rotating beam may be suppressed.

What is claimed is:

1. In combination, a plurality of connecting channels each comprising a number of serially related links, a plurality of discharge tubes, one for each of said channels, means for applying potentials to said tubes to condition for operation each tube corresponding to an idle channel, means for producing cyclically a multiplicity of impulses of different phases, circuit means for applying said impulses to said tubes to cause the operation of the first tube in order corresponding to an idle channel, means to prevent the operation of another one of said tubes, and means controlled by the operated tube for utilizing the corresponding channel in the establishment of a connection.

2. In combination, a plurality of groups of connecting channels, each channel comprising a number of serially related links, a plurality of discharge tubes common to said groups of channels, there being one of said tubes for each channel in any one of said groups, means for connecting said tubes to the channels of any desired group, means for applying potentials to said tubes to condition for operation each tube corresponding to an idle channel, means for producing cyclically a multiplicity of impulses of different phases, circuit means for applying said impulses to said tubes to cause the operation of the first tube in order corresponding to an idle channel, means to prevent the operation of another one of said tubes, and means controlled by the operated tube for utilizing the corresponding channel in the establishment of a connection.

3. In combination, incoming circuits, outgoing circuits, connecting channels for interconnecting an incoming circuit to an outgoing circuit, each channel comprising a number of serially related links, each link being capable of serving in a number of different channels, a series of discharge tubes, one for each of the channels to be tested, means for applying potentials to said tubes to condition for operation each tube corresponding to a channel in which all of the component links are idle, means for producing cyclically a multiplicity of impulses of different phases, circuit means for applying said impulses to said tubes to cause the operation of the first tube in order corresponding to an idle channel, means to prevent the operation of another one of said tubes, and means controlled by the operated tube for utilizing the corresponding channel in the establishment of a connection.

4. In combination, a plurality of connecting channels each comprising a number of serially related links, a plurality of discharge tubes, one for testing each of said channels, means for applying potentials to the electrodes of said tubes in accordance with the busy or idle condition of the associated channels, a discharge tube having a rotating beam and electrode for producing repeatedly series of impulses of different phases, circuit means for applying said impulses to said testing tubes to cause the operation of the first one of said testing tubes corresponding to an idle channel, and means controlled by the operated testing tube for utilizing the associated channel in the establishment of a connection.

5. In combination, a plurality of connecting channels each comprising a number of serially related links, a plurality of discharge tubes, one for testing each of said channels, means for applying potentials to the electrodes of said tube in accordance with the busy or idle condition of the associated channels, a discharge tube having a rotating beam and electrodes for producing repeatedly series of impulses of different phases, circuit means for applying said impulses to said testing tubes, means for rendering said beam effective at a certain point in its cycle to control the potential of said impulses to cause the operation of the first testing tube corresponding to an idle one of said channels, means to prevent the operation of another one of said testing tubes, and means controlled by the operated testing tube for selecting the associated channel for use in a connection.

6. In combination, a plurality of connecting channels each comprising a number of serially related links, a plurality of discharge tubes, one for testing each of said channels, means for applying potentials to the electrodes of said tubes in accordance with the busy or idle condition of the associated channels, a discharge tube having a rotating beam and electrodes for producing repeatedly series of impulses of different phases, circuit means for applying said impulses to said testing tubes, means for rendering said beam effective at a certain point in its cycle corresponding to a particular one of said channels to increase the potential of said impulses to cause the operation of the first one of said testing tubes in order corresponding to an idle channel, and means controlled by the operated testing tube for utilizing the selected channel.

7. In combination, a plurality of connecting channels each comprising a number of serially related links, a plurality of discharge tubes, one for testing each of said channels, means for applying potentials to the electrodes of said tubes in accordance with the busy or idle condition of the associated channels, a discharge tube having a rotating beam and electrodes for producing repeatedly series of impulses of different phases, circuit means for applying said impulses sequentially in a given order to the successive ones of said testing tubes, means for rendering said beam effective at a particular point in its cycle for increasing the potential of said impulses to cause the operation of the first testing tube in order corresponding to an idle channel, means controlled by the operated testing tube for utilizing the selected channel, and means for reversing the direction of rotation of said beam to cause the testing of said channels in the reverse order.

WILLIAM H. T. HOLDEN.
LUTHER G. SCHIMPF.